United States Patent [19]
Koike et al.

[11] Patent Number: 5,369,321
[45] Date of Patent: Nov. 29, 1994

[54] OPTICAL RECORDING MEDIUM

[75] Inventors: Tadashi Koike, Kamakura; Tadahiko Mizukuki, Tokyo; Tomoyoshi Sasakawa, Chiba; Yuko Suzuki; Kouichi Shiina, both of Yokohama, all of Japan

[73] Assignee: Mitsui Toatsu Chemicals, Inc., Tokyo, Japan

[21] Appl. No.: 229,063

[22] Filed: Apr. 18, 1994

Related U.S. Application Data

[63] Continuation of Ser. No. 868,427, Apr. 15, 1992, abandoned.

[30] Foreign Application Priority Data

Apr. 16, 1991 [JP] Japan ................................. 3-083784

[51] Int. Cl.$^5$ ............................................. G11B 7/24
[52] U.S. Cl. ................... 369/275.4; 369/275.1; 369/284
[58] Field of Search ............... 369/275.4, 275.5, 275.1, 369/284, 286, 288; 346/135.1, 76 L; 430/270, 271, 290

[56] References Cited

U.S. PATENT DOCUMENTS

| | | |
|---|---|---|
| 4,359,750 | 11/1982 | Howe . |
| 5,161,150 | 11/1992 | Namba et al. ................... 369/275.4 |
| 5,213,859 | 5/1993 | Aoi et al. ............................. 428/64 |
| 5,274,623 | 12/1993 | Usami et al. ..................... 369/275.1 |

FOREIGN PATENT DOCUMENTS 0368442  5/1990  European Pat. Off. .
0410183  1/1991  European Pat. Off. .

Primary Examiner—Paul M. Dzierzynski
Assistant Examiner—James Beyer
Attorney, Agent, or Firm—Millen, White, Zelano & Branigan

[57] ABSTRACT

An optical recording medium of a single plate type capable of recording comprises a transparent resin substrate having a groove of 900–1800 Å in depth and 0.3–0.6 μm in width, a recording layer containing a dye overlying the substrate, a reflective layer overlying the recording layer and a protective layer overlying the reflective layer, the thickness of the recording layer being 800–1250 Å at the groove portion and 500–1100 Å at the land portion.

6 Claims, 1 Drawing Sheet

OPTICAL RECORDING MEDIUM

This is a continuation of Ser. No. 07/868,427, filed Apr. 15, 1992, now abandoned.

BACKGROUND OF THE INVENTION

1. Field of the Invention

The present invention relates to an optical recording medium, and more particularly, to a recordable optical disk of a single plate type comprising a recording layer containing a dye and a metal reflective layer overlying the recording layer which is recordable and has playability (i.e. capability of being reproduced) by commercially available compact disk players.

2. Description of the Related Art

An optical recording medium capable of writing comprising a recording layer containing a dye such as phthalocyanine dye and the like and a metal reflective layer overlying the recording layer for enhancing reflectivity is disclosed, for example, in U.S. Pat. No. 4,298,975. However, said U.S. patent mentions nothing about playability by commercially available compact disk (CD) players and does not disclose conditions under which there is produced a medium excellent in jitter value and error rate when a pit length recording is conducted.

Optical recording mediums of a single plate type having a high reflectivity and playability by commercially available CD player have been recently proposed, for example, in Optical Data Storage 1989 Technical Digest Series, Vol. 145 (1989), EP 353393 and the like. In particular, there are disclosed dyes used as a recording layer and characteristics of the reflective layer for attaining a high reflectivity.

U.S. Pat. No. 4,990,388 discloses a recording mechanism for a recording layer of an optical recording medium having playability by CD players.

In such optical recording mediums, it is necessary for the mediums to give tracking error signals for track control and radial contrast signals for access to an aimed track.

When a recording layer is formed by a vacuum technique such as sputtering and the like, the recording layer is formed strictly following the shape of groove of the substrate, and therefore, optimization of the above-mentioned tracking error signals and radial contrast signals can be effected by simulation.

However, in the case of an optical recording medium having a layer formed by coating a dye as a recording layer, the surface shape of the recording layer does not follow the groove shape of the substrate, and therefore, it is difficult to design the optimum shape by simulation as mentioned above, and the above-mentioned prior patents disclose nothing about it.

The relation between a tracking error signal and a groove shape of a substrate is disclosed, for example, in Japanese Patent Application Laid-open No. Hei 3-22224. However, the disclosure is not sufficient to attain a complete playability by commercially available CD players.

Among commercially available CD players, a player carrying a 3-beam head has no problem, but the present inventors have found that playability by a player carrying a one beam head is problematic though the reason is not clear.

In addition, with respect to radial contrast signals, the optimization therefore has not yet been reached, and radial contrast signals are not used for access. Instead, an external sensor or the like is used though the access speed is slow.

According to the present inventors' investigation, with respect to playability by CD players and radial contrast signals, it is not enough to optimize the shape of the groove.

In the case of an optical recording medium capable of recording comprising a recording layer containing a dye formed by a coating method and a metal reflective layer overlying the recording layer, the reflection at the interface of the recording layer and the reflective layer is predominant. Therefore the shape of the surface of the recording layer and the thickness of the recording layer on the groove and that on the land become important, However, the shape of the surface of the recording layer and the thickness of the recording layer on the groove and that on the land vary depending on coating conditions such as concentration, surface tension and viscosity of the coating solution, boiling point and evaporation speed of the coating solvent, the manner of rotation in the case of spin coating, and the like, even if the shape of groove of the substrate is the same. Therefore, strict optimization has not yet been effected.

EP 0410183 discloses difference in light path length between the recording layer on the groove portion and that on the land portion and degree of modulation. However, it mentions nothing about the problem of playability by commercially available CD players and radial contrast singnals.

On the contrary, there are generally two methods for recording information in an optical recording medium, that is, pit position recording and pit length recording. In the case of a CD, pit length recording is effected with pits of 9 lengths. In pit length recording, for the purpose of lessening error rate, it is very important to effect recording pits of various lengths with low jitter value (low fluctuation).

At present, various types of CD players are commercially available, but the regeneration signal characteristics are different from player to player, and therefore, the error rate is also different from each other. Therefore, it is necessary that the error rate is sufficiently small even when regeneration is effected by many types of commercially available CD players as far as possible.

However, the present inventors have found the following. It is said that the above-mentioned conventional optical recording mediums capable of recording can be regenerated by commercially available CD players. However, the jitter value of the pits (hereinafter called "pit jitter value") and the jitter value of the part between consecutive-pits (hereinafter called "land jitter value") is not always small. Some CD players fail to reduce error rates sufficiently. When audio information and the like are recorded, there is not so noticeable problem, but when code data and the like are recorded there are serious problems.

Further, such optical recording medium is required to be durable, but durability of conventional mediums is not always sufficient. For example, according to the present inventors' investigation, when conventional optical recording mediums are allowed to stand at 85° C. at 95% RH for a long time, the characteristics of the unrecorded portions hardly change whereas the error rate at recorded portions is deteriorated to a great extent, and according to observation with a microscope of the region where error rate has been deteriorated, pits having defects of several microns with the pit at the center are found.

The present inventors have researched variously so as to eliminate drawbacks of the above-mentioned conventional recordable optical mediums having playability by CD players, and investigated the shape of groove, surface shape of recording layer containing a dye, thickness of recording layer at a groove portion and that at a land portion.

As a result, the present inventors have found particular conditions under which a sufficient radial contrast signal can be assured, there is playability by various commercially available CD players, jitter value and error rate are small and further, characteristics such as error rate and the like do not change when the CD is stored under condition of high temperature and high humidity for a long time.

SUMMARY OF THE INVENTION

An object of the present invention is to provide an optical recording medium capable of assuring a sufficient radial contrast signal.

Another object of the present invention is to provide an optical recording medium playable by commercially available CD players.

A further object of the present invention is to provide an optical recording medium with small jitter value and small error rate.

Still another object of the present invention is to provide an optical recording medium whose characteristics such as error rate and the like are not adversely affected even when the medium is placed under high temperature and high humidity conditions for a long time.

According to the present invention, there is provided an optical recording medium of the single plate type capable of recording which comprises a transparent resin substrate having a groove and a land, the groove being 900–1800 Å in depth and 0.3–0.6 μm in width, a recording layer containing a dye overlying the substrate, a reflective layer overlying the recording layer and a protective layer overlying the reflective layer, the thickness of the recording layer being 800–1250 Å at the groove portion and 500–1100 Å at the land portion.

DESCRIPTION OF THE PREFERRED EMBODIMENTS

Figure 1:
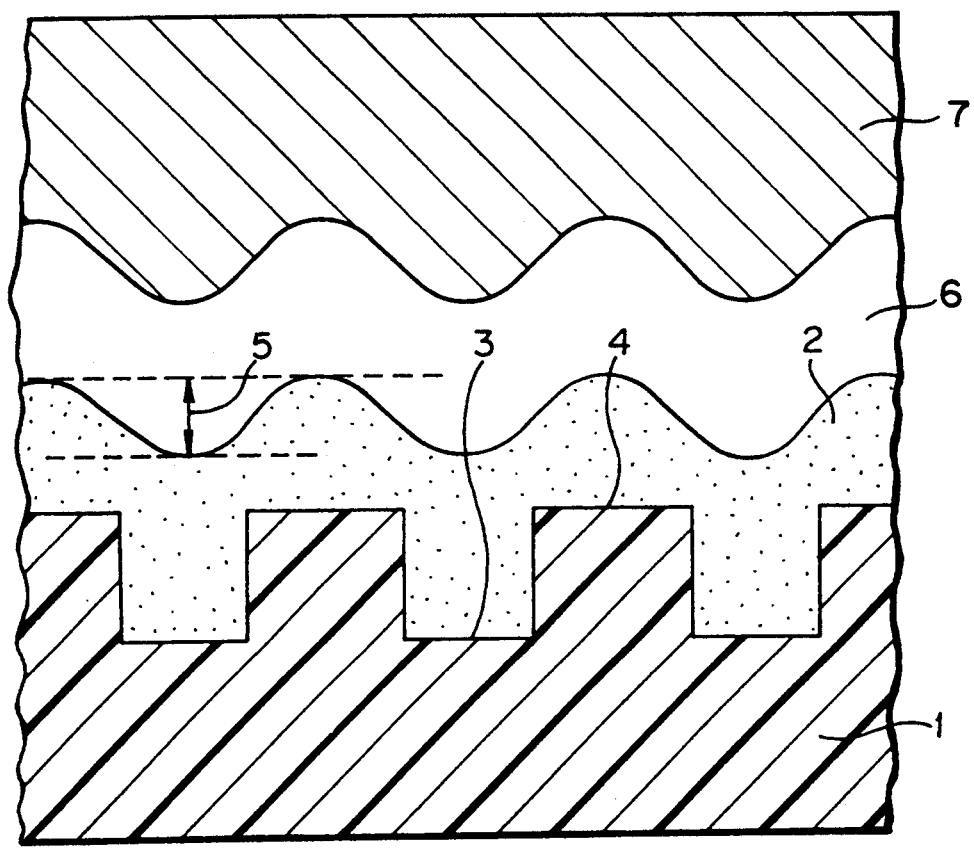
FIG. 1 shows a schematical cross sectional view of an embodiment of a part of the optical recording medium according to the present invention.

Referring to FIG. 1, shown in enlarged cross-section is a recording medium having a recording layer 2 as a coating as a substrate 1 having groove portions 3 and land portions 4 each of which is a region between two grooves with a recording layer material, with a reflective layer 6 overlying the recording layers and protective layer 7 overyling the reflective layer 6. The difference in height (ΔT) between the surface of recording layer 3 on the groove portion and that on the land portion is indicated by 5.

As a transparent resin substrate used in the present invention, one capable of the transmitting a light used for recording signals and readout of recorded information is preferable. Preferable transmittance of light is 85% or higher. Further, it is preferable that optical anisotropy of the substrate is small.

Examplary suitable substrates include thermoplastic resin substrates composed of acrylic resins, polycarbonate resins, polyamide resins, polyvinyl chloride, polyolefin resins or the like.

Among these resins, from the standpoints of mechanical strength of substrate, easy formation of grooves and pits and economy, acrylic resins, polycarbonate resins, and polyolefin resins are preferable, and polycarbonate resin is particularly preferable. These resins may be formed into the substrates by injection molding or cast molding.

The shape of the substrate may be in the form of plate or film, or circle or card. The surface of the substrate is provided with grooves for controlling the recording position. The surface may have partly some prepits for such information.

Such grooves and pits are preferably formed when the substrate is fabricated by injection molding or cast molding. Further they may be formed by applying an ultraviolet light curable resin to a substrate, superposing a stamper thereon and exposing to ultraviolet light.

According the present invention, the optical recording medium comprises a transparent resin substrate, and a recording layer containing a dye, a reflective layer and a protective layer subsequently superposed on the substrate.

The dyes used in the recording layer containing a dye may be dyes having absorption in the wavelength region of oscillation of semiconductor laser such as polymethine dye, phthalocyanine dye, naphthalocyanine dye, naphthoquinone dye, azulene dye, dithiol metal complex dye and the like.

These dyes may have various substituents so as to control the solubility of the dye in a solvent to a desirable range or impart desirable recording characteristics. The dyes may be used alone or in combination.

Among the dyes, phthalocyanine dye and naphthalocyanine dye are preferable from the standpoints of light resistance and durability.

According to the present invention, the recording layer containing a dye can be usually formed by a coating method such as spin coating, spraying, dipping and the like.

When the above-mentioned dye is formed into a layer by a coating method, the dye may be dissolved in a solvent not adversely affecting the substrate. Such solvents are, for example, aliphatic or alicyclic hydrocarbons such as hexane, heptane, octane, decane, cyclohexane, methylcyclohexane, dimethylcyclohexane, cyclooctane and the like; ether type non-polar solvents such as diethyl ether, dibutyl ether, diisopropyl ether and the like; and alcoholic polar solvents such as methyl alcohol, ethyl alcohol, isopropyl alcohol, allyl alcohol, methyl cellosolve, and the like.

According to the present invention, it is important to control the shape (depth and width) of groove of the substrate, the thickness of the recording layer at the groove portion, and at the land portion and the surface shape (ΔT) of the recording layer.

That is, for purposes of obtaining radial contrast signal which meets the CD standard requirements for both unrecorded portions and recorded portions, assuring playability by commercially available CD players, and obtaining excellent jitter value and error rate, it is preferable that the groove in the substrate is 900–1800 Å in depth and 0.3–0.6 μm in width and the thickness of recording layer at the groove portion is 800–1250 Å and that at the land is 500–1100 Å. More preferably, the surface of recording layer at the land portion is higher than that at the groove portion by at least 500 Å.

When the thickness of recording layer at the groove portion is less than 800 Å or that at the land portion is less than 500 Å, radial contrast signal becomes small, and though the jitter value is small, the error rate becomes large.

The reason for increase in error rate despite of small jitter value appears to be that the length of the longest pit (corresponding to the length of 11T pit in EFM modulated recording) and the length of the longest part between consecutive pits (corresponding to the length of 11T part between consecutive pits in EFM modulated recording) which are to be inherently equal to each other become significantly different.

When the difference in height between the surface of the recording layer at the land portion and that at the groove portion ($\Delta T$) is less than 500 Å, the radial contrast signal becomes small.

The thickness of recording layer at the groove portion exceeding 1250 Å is not preferable since the error rate increases to a great extent when the medium is allowed to stand under high temperature and high humidity conditions for a long time.

The thickness of recording layer at the land portion exceeding 1100 Å is not preferable since jitter value and error rate are deteriorated.

On the other hand, the upper limit of the difference in height between the surface of recording layer at the land portion and that at the groove portion is preferably 1200 Å. When the difference exceeds 1200 Å, the tracking error signal becomes too large or assuring a groove reflectivity of 60% or more becomes difficult sometimes, and playability by commercially available CD players is not possible.

When the width of groove exceeds 0.6 μm, the pit jitter value and the land jitter value become so large that poor playability by commercially available CD players is obtained, and though playability by CD players carrying a 3 beam head can be assured, it is difficult to assure playability by CD players carrying a 1 beam head.

When the depth of the groove is less than 900 Å, poor playability by commercially available CD players is obtained, and though playability by CD players carrying a 3 beam head can be assured, playability with those carrying a 1 beam head is assured with difficulty. When regeneration (reproduction) is effected with a CD player carrying a 1 beam head, access is not possible or it takes a long time for access though it is possible to regenerate information sequentially from the beginning.

When the depth of groove exceeds 1800 Å, radial contrast signal becomes large, but reflectivity of groove becomes less than 60% and therefore, playability by CD players is not possible.

It is substantially difficult and not practical to fabricate a substrate having a groove of 900 Å more in depth and less than 0.3 μm in width.

The formation of the recording layer having a difference in height ($\Delta T$) between the surface of recording layer at the land portion and that at the groove portion of 500 Å A or higher may be effected by controlling or selecting the depth of groove in the substrate, type of solvent (boiling point, vaporization speed, and surface tension) used for coating or coating conditions (rotating conditions in the case of spin coating).

For example, when the groove is made deeper and the vaporization speed of solvent slower, the difference in layer thickness between the recording layer at the groove portion and that at the land portion becomes larger.

The shape (the depth and the width) of groove in the substrate and the shape ($\Delta T$) of the surface of recording layer at the land portion and groove portion can be measured by means of a scanning type tunnel microscope or by observing the cross section of the substrate and recording layer with a microscope. The thickness of the recording layer at the groove portion and land portion can be measured by observing the cross section of the recording layer with a microscope.

The width of groove in the present invention is a half-value width, that is, the width at a position where the depth of groove is a half of the total depth.

On the other hand, the term "radial contrast signal" means a quotient of the division of the fluctuation of reflectivity by the average value of reflectivity when the light beam of a player traverses the track while the light beam is focused on the recording layer (focus control). That is, it is defined by the following formula:

$$Rc \text{(radial contrast signal)} = 2(I\max - I\min)/(I\max + I\min)$$

where I max and I min are maximum reflectivity and minimum reflectivity when the beam traverses the track, respectively.

According to the CD standard, it is required that the Rc value is 0.05 or more at the unrecorded portion and 0.2 or more at the recorded portion.

When a recording layer containing a dye is prepared, in addition to the dye used in the present invention, there may be used resins such as nitrocellulose, ethylcellulose, acrylic resins, polystyrene resins, urethane resins and the like, leveling agents, deforming agents and the like in an amount which does not adversely affect the effect of the present invention, for example, about 20% or less, preferably about 10% or less.

As the reflective layer provided on the recording layer, a metal thin film is preferably used.

For purposes of imparting playability by ordinary CD players of the medium of the present invention, the reflectivity of the medium is preferably 60% or more. As preferable metals, there may be mentioned aluminum, gold, silver, copper, platinum, nickel and the like and alloys containing the metals as mentioned above as a component or components. The reflective layer made of the metal may be formed by vapor deposition, sputtering and the like. In usual, the thickness of reflective layer is preferably 500–2000 Å.

In order to protect the metal reflective layer, a protective layer is formed on the reflective layer. As the protective layer, resins are usually used. In particular, from the standpoint of productivity, ultroviolet light curable resins are preferable. The thickness of the protective layer is preferably about 1–15 μm.

The optical recording medium of the present invention is irradiated with a laser beam through the substrate to record information signals or read out the information. Wavelength of the laser beam is preferably 640–850 nm. Semiconductor laser having an oscillatory wavelength of such range as above is preferably used. For recording, the laser output is made about 5–12 mW on the recording film while rotating the medium, and for readout, the laser output is made about 1/10 times that for recording.

Printing may be made on the protective layer of the optical recording medium of the present invention.

The present invention is explained in detail in the following examples, but should not be construed as limited by the examples.

As phthalocyanine dye used in Example 1, Pd-tetra-(t-butylcyclohexyloxy) phthalocyanine was prepared by using 3-(t-butylcyclohexyloxy)-1,2-dicyanobenzene and $PdCl_2$ according to a conventional method, for example, EP 232,427.

Then, one mole of the resulting Pd-tetra-(t-butylcyclohexyloxy)phthalocyanine was reacted with 3.3 moles of $Br_2$ in a solvent, methylene chloride and a phthaiocyanine dye composed of Pd-tetra-(t-butylcyclohexyloxy) phthalocyanine having average 3.0 atoms of bromine per one molecule of said phthalocyanine was obtained.

In Example 2 et seq., the dyes were prepared in a manner similar to the above-mentioned procedure.

EXAMPLE 1

A 3.1 wt. % solution of a brominated (average 3.0 atoms/molecule) Pd-tetra-(t-butylcyclohexyloxy) phthalocyanine in methylcyclohexane was dropped on the center portion of the surface having a groove (1400 Å in depth, 0.5 μm in width, 1.6 μm in pitch) of an injection molded polycarbonate resin substrate of 1.2 mm thick and 120 mm in diameter. Then the resin substrate was rotated at a speed of 1000 rpm for 10 sec. The resin substrate was dried at 40° C. for 10 min. and a recording layer substantially composed of a phthalocyanine dye was formed on a resin substrate.

The thickness and surface shape of the recording layer was measured by observing the cross section by means of an electron microscope. The thickness at the groove portion and that at the land portion of the recording layer were 1100 Å and 700 Å, respectively, and the surface of the recording layer at the land portion was higher than that at the groove portion by 1000 Å ($\Delta T = 1000$ Å).

On the recording layer was formed a gold thin film of 80 nm thick as a reflective layer by means of sputtering, and further an ultraviolet ray-cured resin layer of 5 μm thick was formed on a reflective layer to produce an optical recording medium.

While the resulting optical recording medium was placed on a turntable and rotated at a linear speed of 1.4 m/s, there was used a drive provided with an optical head carrying a semiconductor laser having an oscillation wavelength of 780 nm and a laser beam was controlled such that the laser beam focused on the recording layer through the resin substrate. Thus there were measured reflectivity on the groove and radial contrast signal at the unrecorded portion with a laser output of 1 mW on the recording surface. Table 1 shows the result.

Then the laser output was made the optimum recording condition of this medium, 7 mW, and a music was recorded with the same EFM modulation signal as that used in CD, and then the output of laser was made 1 mW. There were measured radial contrast signal, 3T pit jitter value, 3T land jitter value and error rate at the recording portion. The result was summarized in Table 1. Further, for purposes of investigating playability by commercially available CD player, regeneration of record was effected by the following CD player. The regenerated result was summarized in Table 2.

| No. | Manufacturer | Type of CD Player | Type of Head |
|---|---|---|---|
| A | Sony | CDP - C900 | 3 beams |
| B | Marantz Japan | CD - 50 | 3 beams |
| C | Marantz Japan | CD - 99SE | 1 beam |
| D | Yamaha | CDX - 1050 | 3 beams |
| E | Matsushita Denki Sangyo | SL - PA10 | 1 beam |
| F | Matsushita Denki Sangyo | SL - P550 | 1 beam |

Durability of the medium was investigated by allowing the medium to stand for 1000 hours under condition of 85° C. and 95% RH and then measuring the jitter value and error rate. Table 2 shows the result.

EXAMPLES 2–4 AND COMPARATIVE EXAMPLES 1–5

The procedure of Example 1 was repeated using the same dye as in Example 1 except that there were used a substrate having a groove of a shape, a solvent, a concentration of the solution and a rotating speed as shown below, and a medium was produced and evaluated.

The recording laser power was the optimum power for each medium. Table 1 and Table 2 show the results.

| | Shape of groove | | | Concentration | Rotating |
|---|---|---|---|---|---|
| | Depth (Å) | Width (μm) | Solvent | (% by weight) | speed (rpm) |
| Example | | | | | |
| 2 | 950 | 0.35 | Methyl-cyclo-hexane | 2.8 | 1000 |
| 3 | 1400 | 0.50 | Dibutyl ether | 3.1 | 700 |
| 4 | 950 | 0.35 | Octane | 3.1 | 700 |
| Comparative Example | | | | | |
| 1 | 950 | 0.35 | Octane | 3.5 | 700 |
| 2 | 950 | 0.35 | Methyl-cyclo-hexane | 3.0 | 1100 |
| 3 | 800 | 0.35 | Methyl-cyclo-hexane | 3.1 | 1100 |
| 4 | 1900 | 0.58 | Ethyl-cyclo-hexane | 2.1 | 1000 |
| 5 | 950 | 0.70 | Methyl-cyclo-hexane | 3.1 | 1000 |

EXAMPLES 5 AND 6

The procedure of Example 1 was repeated except that there were used a substrate having a groove of a shape, a solution having a concentration of a brominated (average 3.5 atoms/molecule) Pd-tetra-(t-butylcyclohexyloxy)phthalocyanine dye in a solvent and a rotating speed as shown below, and a medium was produced and evaluated. The recording laser power was the optimum power for each medium. Tables 1 and 2 show the results.

| Example | Shape of groove Depth (Å) | Width (μm) | Solvent | Concentration (% by weight) | Rotating speed (rpm) |
|---|---|---|---|---|---|
| 5 | 1600 | 0.5 | Dibutyl ether | 4.0 | 700 |
| 6 | 1600 | 0.5 | Ethyl-cyclo-hexane | 4.0 | 700 |

EXAMPLES 7–8 AND COMPARATIVE EXAMPLES 6–8

The procedure of Example 1 was repeated except that there were used a substrate having a groove of a shape, a solution having a concentration of a brominated (average 3.5 atoms/molecule) Pd-tetra-(2,4-dimethyl-pentan-3-oxy) phthalocyanine in a solvent and a rotating speed as shown below, and a medium was produced and evaluated.

The recording laser power was the optimum power for each medium. Table 1 and 2 show the results.

| | Shape of groove Depth (Å) | Width (μm) | Solvent | Concentration (% by weight) | Rotating speed (rpm) |
|---|---|---|---|---|---|
| Example | | | | | |
| 7 | 1250 | 0.45 | Dimethyl-cyclo-hexane | 3.1 | 1000 |
| 8 | 1250 | 0.45 | Dimethyl-cyclo-hexane | 3.5 | 700 |
| Comparative Example | | | | | |
| 6 | 950 | 0.35 | Dibutyl ether | 3.1 | 700 |
| 7 | 950 | 0.35 | Methyl-cyclo-hexane | 4.0 | 700 |
| 8 | 1250 | 0.45 | Octane | 3.0 | 700 |

TABLE 2

| | Playability by CD players | | | | | | Jitter value (ns) | | Error rate (%) |
|---|---|---|---|---|---|---|---|---|---|
| | A | B | C | D | E | F | Pit | Land | |
| Example | | | | | | | | | |
| 1 | ○ | ○ | ○ | ○ | ○ | ○ | 20 | 22 | 0.08 |
| 2 | ○ | ○ | ○ | ○ | ○ | ○ | 18 | 21 | 0.05 |
| 3 | ○ | ○ | ○ | ○ | ○ | ○ | 18 | 19 | 0.03 |
| 4 | ○ | ○ | ○ | ○ | ○ | ○ | 20 | 21 | 0.1 |
| 5 | ○ | ○ | ○ | ○ | ○ | ○ | 17 | 19 | 0.08 |
| 6 | ○ | ○ | ○ | ○ | ○ | ○ | 18 | 20 | 0.04 |
| 7 | ○ | ○ | ○ | ○ | ○ | ○ | 16 | 17 | 0.02 |
| 8 | ○ | ○ | ○ | ○ | ○ | ○ | 18 | 20 | 0.02 |
| Comparative Example | | | | | | | | | |
| 1 | ○ | ○ | ○ | ○ | ○ | ○ | 23 | 26 | 5.8 |
| 2 | ○ | ○ | ○ | ○ | ○ | ○ | 19 | 20 | 3.2 |
| 3 | ○ | ○ | x | ○ | x | x | 23 | 25 | 0.11 |
| 4 | x | ○ | x | x | x | x | 22 | 24 | 0.2 |
| 5 | ○ | ○ | x | ○ | x | x | 33 | 36 | 4.0 |
| 6 | ○ | ○ | ○ | ○ | ○ | ○ | 20 | 22 | 0.05 |
| 7 | ○ | ○ | ○ | ○ | ○ | ○ | 35 | 40 | 15 |
| 8 | ○ | ○ | ○ | ○ | ○ | ○ | 21 | 28 | 4.5 |

Playability by CD players was tested by regenerating using commercially available CD players A–F as mentioned in Example 1.
○: No problem
x: Access to an aimed track is not possible.

As is clear from Table 1 and Table 2, the examples of the present invention all exhibit high reflectivity and sufficiently low jitter values and error rates. The radial contrast is large both at unrecorded portion and recorded portion. The mediums have a good playability by commercially available CD players. Even when the mediums are allowed to stand under high temperature and high humid conditions, they exhibit excellent characteristics such that the jitter values and error rates are hardly changed.

The comparative examples are summarized as shown below.

In Comparative Examples 1 and 7, the layer thickness of the recording layer at the groove portion is thick so that after the durability test, error rates increased to a great extent. When the mediums subjected to such durability test were observed with an electron microscope, it

TABLE 1

| | Layer thickness (Å) | | ΔT (Å) | Reflectivity (%) | Rc | | Jitter value (ns) | | Error rate (%) |
|---|---|---|---|---|---|---|---|---|---|
| | Groove | Land | | | Rcb | Rca | Pit | Land | |
| Example | | | | | | | | | |
| 1 | 1100 | 700 | 1000 | 67 | 0.09 | 0.57 | 19 | 20 | 0.08 |
| 2 | 950 | 600 | 600 | 68 | 0.06 | 0.38 | 18 | 19 | 0.04 |
| 3 | 1150 | 550 | 800 | 69 | 0.07 | 0.42 | 16 | 18 | 0.02 |
| 4 | 1250 | 1000 | 700 | 71 | 0.06 | 0.34 | 19 | 20 | 0.10 |
| 5 | 1150 | 650 | 1100 | 67 | 0.10 | 0.62 | 15 | 18 | 0.06 |
| 6 | 1200 | 600 | 1000 | 68 | 0.09 | 0.55 | 17 | 18 | 0.04 |
| 7 | 850 | 600 | 1000 | 73 | 0.06 | 0.45 | 16 | 16 | 0.01 |
| 8 | 1250 | 900 | 900 | 67 | 0.08 | 0.50 | 18 | 21 | 0.02 |
| Comparative Example | | | | | | | | | |
| 1 | 1450 | 1100 | 600 | 69 | 0.06 | 0.36 | 20 | 22 | 0.20 |
| 2 | 750 | 500 | 700 | 68 | 0.00 | 0.10 | 18 | 20 | 2.8 |
| 3 | 850 | 550 | 500 | 71 | 0.05 | 0.23 | 21 | 24 | 0.09 |
| 4 | 1200 | 500 | 1200 | 55 | 0.12 | 0.55 | 21 | 23 | 0.1 |
| 5 | 1050 | 700 | 600 | 71 | 0.05 | 0.35 | 32 | 36 | 3.8 |
| 6 | 1050 | 550 | 450 | 70 | 0.03 | 0.15 | 18 | 22 | 0.03 |
| 7 | 1600 | 1300 | 650 | 65 | 0.06 | 0.40 | 31 | 33 | 3.2 |
| 8 | 1100 | 450 | 600 | 69 | 0.03 | 0.18 | 19 | 25 | 3.5 |

ΔT: Difference in level between land and groove at the surface of recording layer
Rc: Radial contrast signal
Rc = 2(I max − I min)/(I max + I min)
I max: Maximum value of reflectivity upon traversing the track
I min: Minimum reflectivity upon traversing the track
Rcb: Radial contrast signal at unrecorded portion
Rca: Radial contrast signal at recorded portion was found that a defect of about 2 μm was formed at the center of pit.

In Comparative Example 2, the layer thickness of the recording layer at the groove portion was so thin that error rate and radial contrast were very poor and therefore, the medium was not preferable.

In Comparative Example 3, the depth of the groove of the substrate is small so that playability after recording was poor.

In Comparative Example 4, the groove is so deep that reflectivity was lowered and there were many players which could not regenerate the record.

In Comparative Example 5, the groove was so wide that both jitter value and error rate were poor, and playability by commercially available CD players was poor.

In Comparative Example 6, the difference in height between the surface of recording layer at the land portion and that at the groove portion was so small that radial contrast was poor.

In Comparative Example 7, the thickness of recording layer on the land portion was so thick that jitter value and error rate were poor.

In Comparative Example 8, the recording layer thickness at the land portion was so thin that error rate and radial contrast were poor.

What is claimed is:

1. An optical recording medium of a single plate type capable of recording which comprises a transparent resin substrate having a groove and a land, the groove being 900–1800 Å in depth and 0.3–0.6 .μm in width, a dye-containing recording layer overlying the substrate, a reflective layer overlying the recording layer and a protective layer overlying the reflective layer, the thickness of the recording layer being 800–1250 Å at the groove portion and 500–1100 Å at the land portion and thicker at the groove portion than at the land portion, and the surface of the recording layer at the land portion being higher than the surface of the recording layer at the groove portion by 500–1200 Å.

2. The optical recording medium according to claim 1 having a reflectivity through the substrate thereof at unrecorded portions of the groove portions thereof of 60% or more.

3. The optical recording medium according to claim 2 in which the recording layer contains a phthalocyanine dye.

4. The optical recording medium according to claim 1 having signals recorded thereon in the grooves thereof by pit length recording.

5. The optical recording medium according to claim 2 having signals recorded thereon in the grooves thereof by pit length recording.

6. The optical recording medium according to claim 3 having signals recorded thereon in the grooves thereof by pit length recording.

* * * * *